United States Patent [19]

de Sivry et al.

[11] Patent Number: 4,493,966
[45] Date of Patent: Jan. 15, 1985

[54] INTERNAL MANDREL USED IN AN OPERATION OF BUTT JOINING TWO LENGTHS OF TUBING BY WELDING

[75] Inventors: Bruno de Sivry, Paris; Bernard Sudreau, Puteaux; Michel Jegousse, St Herblain; Yves Le Hir, Nantes, all of France

[73] Assignee: Compagnie Francaise des Petroles, Paris, France

[21] Appl. No.: 376,999

[22] Filed: May 11, 1982

[30] Foreign Application Priority Data

May 13, 1981 [FR] France ............................ 81 09479

[51] Int. Cl.³ .............................................. B23K 15/00
[52] U.S. Cl. ............................. 219/121 EC; 219/160
[58] Field of Search ..................... 219/61.1, 59.1, 160, 219/121 EC, 121 ED, 121 LC, 121 LD

[56] References Cited

U.S. PATENT DOCUMENTS 3,261,529  7/1966  Pagan ................................. 219/160
3,461,264  8/1969  Nelson et al. ..................... 219/160

*Primary Examiner*—C. L. Albritton
*Attorney, Agent, or Firm*—Sughrue, Mion, Zinn, Macpeak & Seas

[57] ABSTRACT

An internal mandrel (22) cooperating in the operation of joining two successive lengths of tubing by welding, and it is characterized in that this mandrel comprises zones (25, 26, 27) separated longitudinally and serving respectively for matching, welding, and welding checking, and means of displacement of the mandrel (22) by a step, enabling the latter to present the said zones in succession in front of one and the same working station.

15 Claims, 5 Drawing Figures

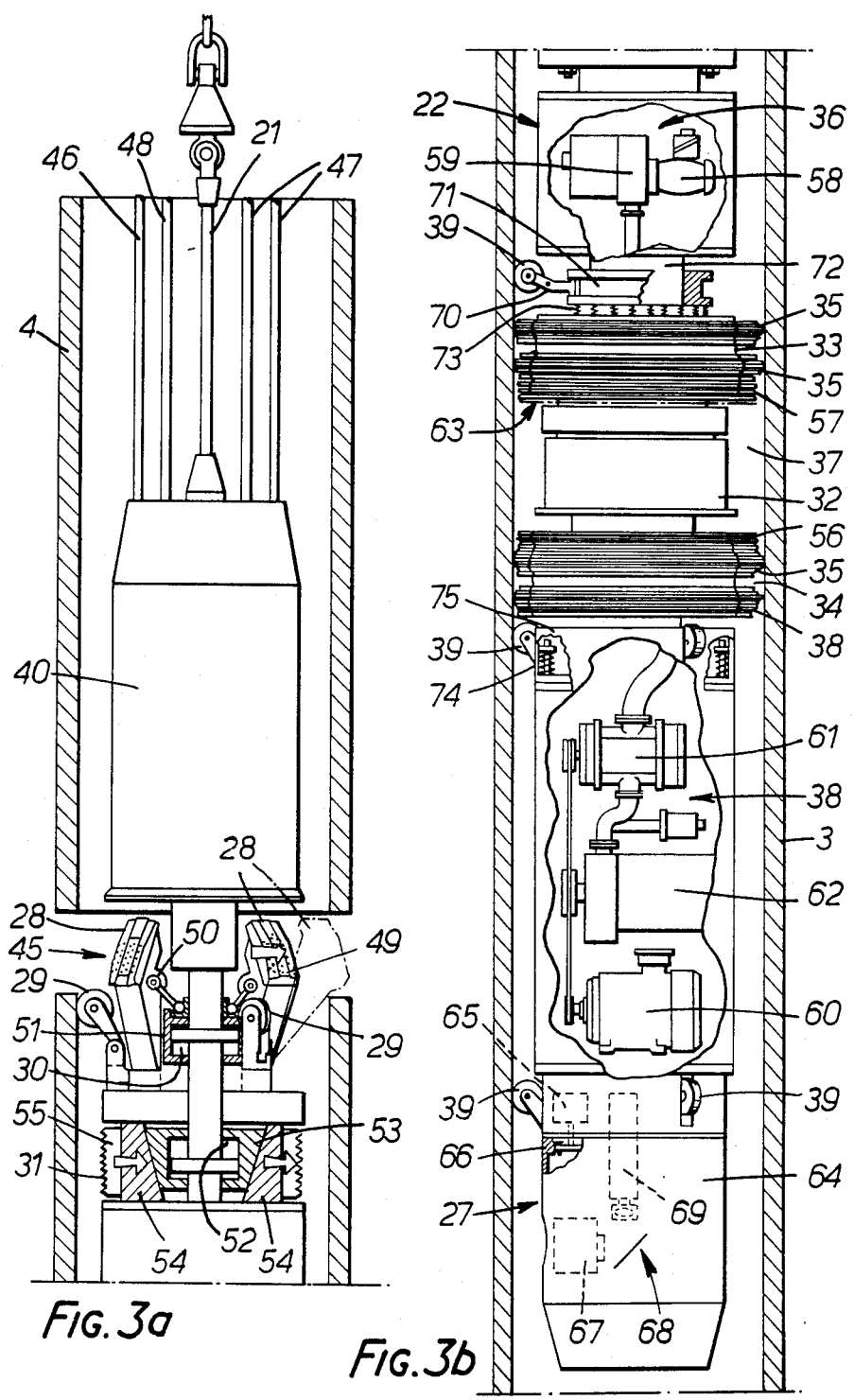

INTERNAL MANDREL USED IN AN OPERATION OF BUTT JOINING TWO LENGTHS OF TUBING BY WELDING

FIELD OF THE INVENTION

The present invention relates to an internal mandrel used in carrying out an operation of butt joining two lengths of tubing by welding.

BACKGROUND OF THE INVENTION

It has already been proposed to insert into two lengths of tubing, which are to be butt joined by welding the ends of these lengths of tubing disposed facing one another and thus defining a junction region, a device comprising sensor means capable of detecting the longitudinal position of one of these ends and centring means capable of centring these two ends relative to one another by bearing, by means of front and rear shoes, on the respective inside walls of each of the two lengths of tubing. In addition, provision has been made to install means, known as welding means, cooperating in carrying out the welding operation and actually consisting of welding heads, between the front arrangement of shoes and the rear arrangement of shoes.

With an arrangement of this kind only little space is available for the installation of the welding means, and in particular it would be impossible to effect electron-beam welding. The method of matching the two lengths of tubing is moreover determined by the need for the front and rear arrangements of shoes to be disposed some distance away from the junction region, and automatic relative centring through the longitudinal thrust of one length of tubing towards the other cannot be contemplated.

SUMMARY OF THE INVENTION

The present invention on the contrary proposes to allow full freedom of choice of the system of welding and of the system of sensing and centring, and to enable these systems to be installed under the best conditions.

To this end it provides an internal mandrel in which the sensing means and the centring means are disposed in a first zone, called the matching zone, of the mandrel and the welding means are disposed in a second zone, called the welding zone, of the mandrel, this second zone being separated longitudinally from the matching zone, and which is provided with means for displacement, inside the lengths of tubing, by a step equal to the distance from the welding zone to the matching zone.

In this way, after the matching zone of the mandrel has been placed opposite the junction zone and the two lengths of tubing have been matched, it is possible for the welding zone of the mandrel to be brought automatically opposite the junction region for the purpose of effecting the welding; the welding and the matching are thus effected at the same working station, but with means installed in different zones of the internal mandrel.

The displacement by one step can be effected by the usual handling means which may be used for inserting the mandrel into the lengths of tubing, if these means are provided with a system determining a displacement equal to the distance separating the welding zone from the matching zone. If these usual handling means are composed of a cable and a winch, a system may be provided for the automatic winding or unwinding of a determined length of the cable equal to the distance separating the welding zone from the matching zone.

According to another characteristic of the invention the means of displacement by one step are means incorporated into the internal mandrel and comprise an assembly consisting of a link operated by a jack and adapted to assume one of two lengths the difference between which is equal to the said step, and of two controlled, radially extensible clamping members for retaining the mandrel in the course of its displacement, which members are adapted to bear against an inside wall of the length of tubing and are mounted respectively on the side where one longitudinal end of the link is situated and on the side where the other longitudinal end of the link is situated.

In order to facilitate the description, the term "front" of the mandrel will be used to denote the portion of the latter which is driven further into the length of tubing, referred to as the "preceding" length, which receives a "new" length of tubing. In the case of a pipeline being laid, the "preceding" length will be the last of the lengths already connected to the pipeline by previous welding operations.

The sensing means and the centring means preferably comprise on the one hand circumferentially distributed fingers fastened to connecting rods joined to a hydraulic jack, called a finger extending jack, which when made operative moves the fingers radially apart, these fingers being provided at the front with stop surfaces adapted to come to bear against a preceding length of tubing, and at the rear with inclined guide surfaces, which together partially delimit a kind of truncated cone pointed towards the rear and adapted to guide a new length of tubing, and, on the other hand, sensing rollers situated in front of the fingers and provided with means urging them radially apart, together with a finger extending jack control means sensitive to the radial distance between the sensing rollers and operated when this radial distance is greater than the radial distance which can exist between the rollers as long as they are within a length of tubing.

In front of these fingers and these rollers, the mandrel is advantageously provided with a radially extensible controlled clamping member adapted to bear against the inside wall of a length of tubing in order to retain the mandrel longitudinally during matching.

If use is also made of one-step displacement means comprising a link and two controlled clamping members, it is then economical for one of these two controlled clamping members, serving to retain the mandrel in the course of the displacement of the latter, to be constituted by the controlled clamping member for retaining the mandrel during matching.

According to one object of the invention, in the case of electron-beam welding, the welding zone contains a fire prevention ring disposed between two seals adapted to be inflated so as to be applied against an inside wall of a length of tubing, and means for establishing a vacuum in the space between these seals.

According to a development of the invention, the mandrel comprises a third zone, called the welding check zone, disposed longitudinally, in relation to the second zone, on the opposite side to the first zone, and means are provided for its displacement inside the lengths of tubing by a step equal to the distance from the welding check zone to the welding zone.

These last-mentioned displacement means, like those relating to the step between the welding zone and the matching zone, may consist of the usual handling means for the mandrel, particularly a cable and winch, these means being provided with a system for determining a displacement equal to the desired step. They may be composed of a system consisting of a link and clamp members and incorporated into the mandrel as previously described. In this last case, it is advantageous to provide an equal step between the welding zone and the matching zone, on the one hand, and between the welding check zone and the welding zone, on the other hand, and to use the same displacement means for making these two steps. It would obviously also be possible to use the usual handling means for making one of these two steps and means incorporated into the mandrel for making the other step.

Further features of the invention will emerge from an example of embodiment which will now be given, without constituting a limitation, with reference to the accompanying drawings, which relate more particularly to the case of the joining of lengths of tubing for so-called "J" laying of a pipeline at sea.

BRIEF DESCRIPTION OF THE DRAWINGS

FIGS. 3a and 3b are views in elevation, on a larger scale, of the operative part of a similar internal mandrel in the longitudinal position which it occupies before the matching of two lengths of tubing.

DESCRIPTION OF THE PREFERRED EMBODIMENT

Figure 1:
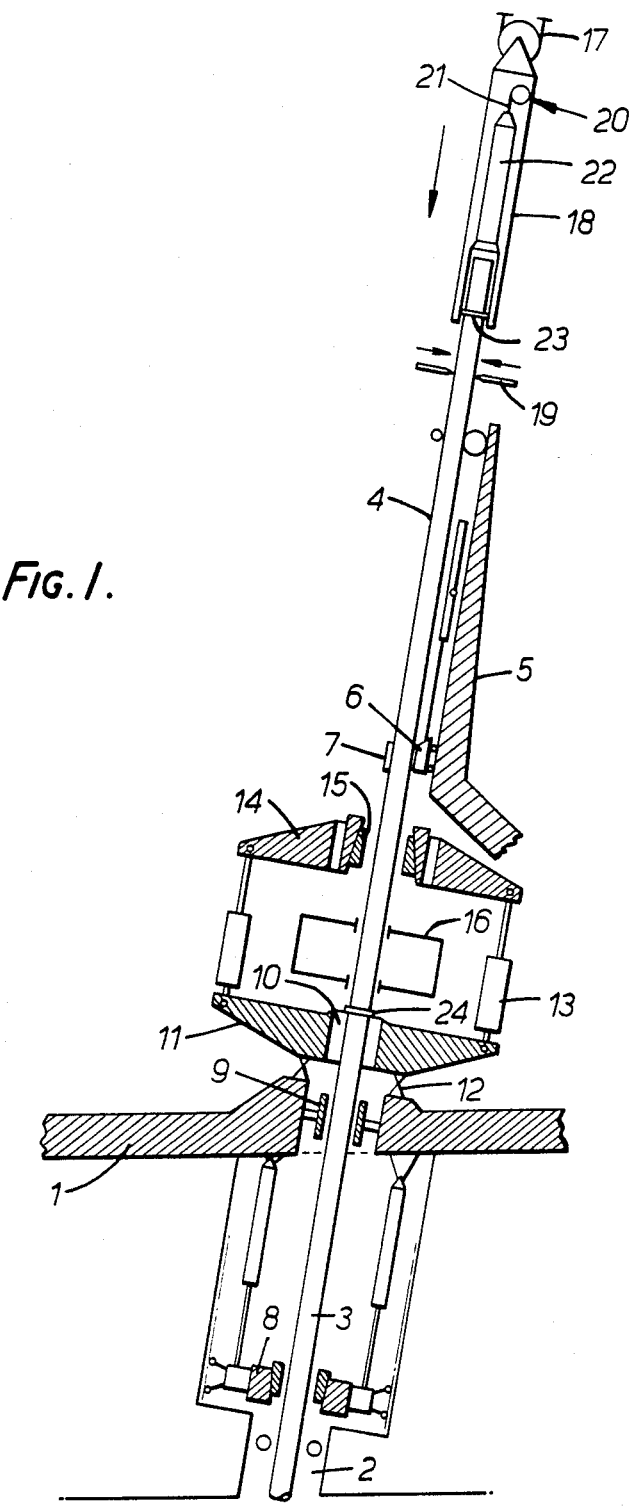
FIG. 1 is a view in elevation of an entire handling and welding installation for joining successive lengths of tubing forming a pipeline in the course of "J" laying.

FIG. 1 shows an installation which in particular applies the French Patent published under No. 2310515 and applied for under No. 75.14079 on the 6th May 1975 for: "Process for the joining and laying of a submarine pipeline and apparatus for carrying out the process", and also the French patent application filed on the 29th Nov. 1978 under No. 78.33660 for: "Process for the matching of an additional tubular element on a tubular structure, and apparatus for carrying out the process."

A floating platform 1 used for laying a pipeline at sea has a passage 2 into which passes the preceding length of tubing 3, that is to say the last element of the pipeline being laid, to which length of tubing a new length of tubing 4 is to be joined, this new length being brought into line with the length 3 by a rocking loading arm 5 on which is mounted a carriage 6 provided with a retaining gripper 7 adapted to grip the length of tubing 4. The installation also comprises: a wedge box 8 adapted to be displaced by jacks, clamping grippers 9, a retaining collar 10 mounted on a first bed 11 carried by hydraulic stops 12 and connected by jacks 13 to a second bed 14 provided with clamping grippers 15, a welding chamber 16 outside the lengths of tubing and containing electron guns (not shown), a pulley block 17, a rocking bar 18, and a centring guillotine 19. The rocking bar 18 carries a winch 20 of the brake motor type, on which is wound a cable 21 carrying the internal mandrel 22, and it serves to house the said mandrel; in addition, it is provided with clamping means capable of retaining the length of tubing 4, of which a collar has been shown at 23, while similarly a collar of the length of tubing 3 has been shown at 24.

There will simply be indicated here the movements which can be made during and in the vicinity of the utilisation of the internal mandrel 22. The length of tubing 4 is moved through the bed 14 and introduced into the welding chamber 16 through the action of the carriage 6, and is stopped at about 10 cm from the length of tubing 3, after which the internal mandrel 22, lowered through the length of tubing 4 by the cable 21, is introduced into the length of tubing 3 and assumes its matching position, as will be explained later on. The length of tubing 4 is then lowered by the bed 14 and the jacks 13 to encounter the length of tubing 3, and it is automatically centred by the internal mandrel 22. It is then firmly held in place by the jacks 13, and it is thereupon possible to move the internal mandrel 22 without risk of decentring the lengths of tubing. This mandrel is displaced a first time in order to bring it into the welding position and, after the welding has been completed, it is moved a second time in order to bring it into the welding check position. On completion of the welding check, and after the rocking bar 18 has been lowered and clamped under the collar 23 and the loading arm 5 has been swung into the horizontal position, the internal mandrel 22 is raised into the rocking bar 18 and the pulley block 17 is placed under tension in order to proceed with the lowering of the pipeline, to which the length of tubing 4 has been added, before preparing to bring into position another length of tubing and similarly proceeding to join it to the free end of the length of tubing 4.

Figure 2A:
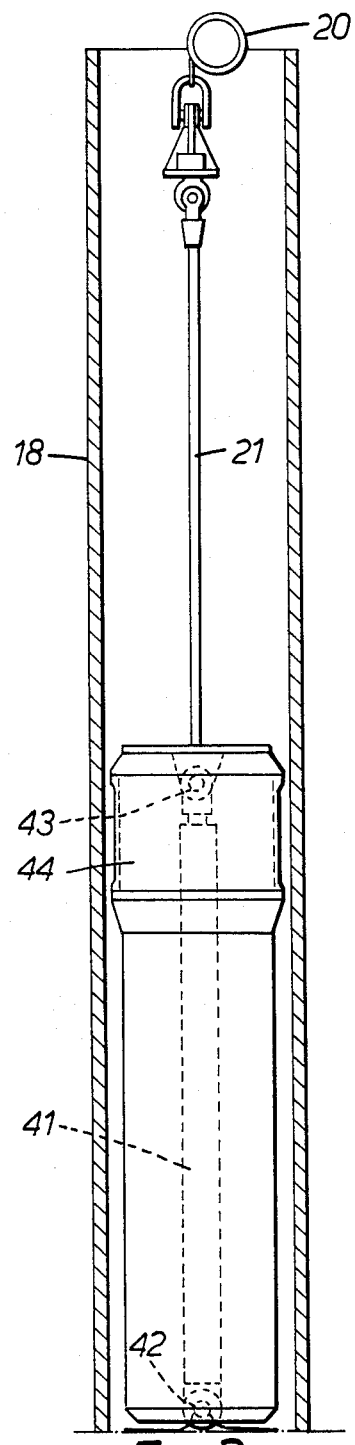
FIGS. 2a and 2b are general views in elevation of an internal centring, welding and welding check mandrel used in the operation of joining lengths of tubing.
Figure 2B:
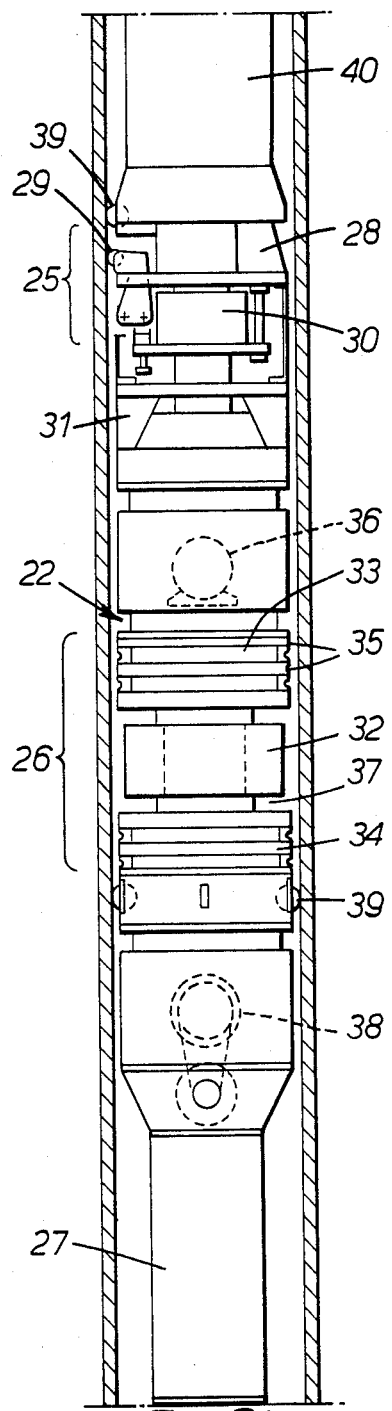

In FIG. 2, which is composed of FIG. 2a and of FIG. 2b, which goes beneath FIG. 2a, an internal mandrel, such as 22, can be seen on a larger scale in the locked position inside the rocking bar 18, the locking being effected by conventional means (not shown). This internal mandrel comprises a matching zone 25, a welding zone 26, and a welding check zone 27, these zones being separated from one another longitudinally. The matching zone 25, which will be described in greater detail with reference to FIG. 3, contains matching fingers 28 having a transverse front face and an oblique rear face, sensing rollers 29, and a jack 30 controlling the transverse extension of the fingers 28. A clamping member 31, for example one having clamp jaws, makes it possible in the radial extension position to retain the mandrel 22 longitudinally during the matching.

The welding zone 26, which is intended for electron-beam welding, contains a fire prevention ring 32 disposed between two inflatable seals 33, 34. Each seal 33, 34 is composed of a plurality of elementary seals such as 35, following one another in the longitudinal direction, and a vacuum is produced between elementary seals 35 by means of a motor-pump unit 36. The vacuum in the space 37 formed between the seals 33 and 34 is established between $10^{-1}$ and $10^{-2}$ Torr by means of a main pumping unit 38. Guide rollers, such as 39, effect in conjunction with the rollers 29 the centring of the internal mandrel 22 in the rocking bar 18 and in the lengths of tubing 4 and 3. Above the matching zone 25 a box 40 is disposed, in which the distribution of the operating fluids for the various members of the internal mandrel 22 is effected. The connections between the successive zones of the internal mandrel 22 have a certain flexibility in order to facilitate the displacement of the mandrel in the lengths of tubing 4 and 3.

In the example illustrated in FIG. 2, the mandrel 22 is provided with its own means for displacement by a step, this means comprising a link 41 disposed in a telescopic sheath. The length of this link may assume two different values depending on whether a double acting jack, of conventional type and not shown in the drawings, for operating the link is fed with compressed fluid on one side or on the other. This link 41 is attached by an articulation 42 to the box 40, and by an articulation 43 to a clamp member 44, which is for example inflatable and which, when in the radial extension position, is capable of longitudinally retaining the mandrel 22 in a length of tubing, this retention being effected in particular during the one-step displacements of the mandrel. A distance has here been adopted between the matching zone 25 and the welding zone 26 which is equal to the distance between the welding zone 26 and the welding check zone 27, and the two lengths which the link 41 can assume differ from one another by the value of these distances. The cable 21 is fastened at its lower end to the member 44. In the position in which the mandrel 22 is locked in the rocking bar 18, the link 41 is in the retracted condition.

The displacement of the mandrel 22 by one step is effected in the following manner. After the mandrel 22 has been brought into the matching position defined by the bearing of the fingers 28 on the top end of the length of tubing 3, and with the clamping member 31 in the operating condition, that is to say in the radial extension state, the jack of the link 41 is fed so as to move the link 41 into the elongated state, the clamping member 44 is brought into the operative state, and then the clamping member 31 is put out of action and the jack of the link 41 is fed so as to bring the said link into the retracted position, thereby bringing the welding zone 26 into the junction region bearing the reference 45 in FIG. 3. In order to pass from the welding position of the internal mandrel 22 to the welding check position, the clamping member 31 is made operative and the clamping member 44 inoperative, and the double operation of the link 41 and of the clamping members 44 and 31, which has just been described, is carried out, so that the welding check zone 27 is brought in front of the junction region 45.

In FIG. 3, which is composed of two parts, namely a FIG. 3a and a FIG. 3b which goes under FIG. 3a, an internal mandrel 22 is shown in greater detail, it being assumed that the displacement of the mandrel by one step is effected by means of the cable 21, and that consequently there is no one-step displacement means integrated into the mandrel 22. The length of a mandrel 22 of this kind may for example be of the order of 7 meters and the weight of the order of 3000 kg.

In this example the cable 21 is solely a mechanical carrier cable; the electrical commands coming from a control desk (not shown) are transmitted to the box 40 by an electric cable 46. Energy is transmitted to the box 40 through flexible hydraulic hoses 47 and a compressed air hose 48.

With regard to the operation of the fingers 28, which are fixed at an articulation point (not shown) situated at the front end of the fingers, they can be moved apart in the radially outward direction, as shown by the arrow 49, by means of connecting rods 50 articulated at one end on these fingers and at their other end on a crown 51 forming the body of the jack 30 and adapted to be displaced longitudinally by that jack. The operation of this jack 30, which is a hydraulic jack, is triggered when the radial position of the sensing rollers 29 indicates that they have passed out of the length of tubing 4, with the aid of means (not shown) which themselves are conventional, and which may for example comprise a hydraulic control valve controlled by an electric relay sensitive to the position of the support arms of the rollers 29. A load detector (not shown) disposed on the cable 21 inside the box 40 stops the winch 20 when it detects an absence of load due to the fact that the fingers 28 have come to bear against the rear end (here the top end) of the length of tubing 3.

When the length of tubing 4 is brought near the length of tubing 3, for example through the action of the jacks 13, in a first phase the length of tubing 4 slides over one of the oblique faces of the fingers 28, which has the effect of centring the length of tubing 4 relative to the length of tubing 3. In a second phase the force developed by the length of tubing 4 on the fingers 28 forces the latter to retract radially inwards, thus allowing the two end faces of the lengths of tubing 3 and 4 to be applied against one another. The force holding the fingers 28 radially apart is limited to a desired value by an adjusted check valve (not shown) placed in the box 40.

Before the final operation of bringing the lengths of tubing 4 and 3 together, the clamping member 31 has been made operative. In order to do this, a hydraulic jack 52, when it is operated, moves the frustoconical body 53 of this jack longitudinally forwards, which then pushes wedges 54, which are provided with or integral with clamp jaws 55 on their periphery, radially outwards. Three jaws 55 thus ensure perfect centring of the internal mandrel 22 in the length of tubing 3.

In the welding zone, additionally to the seals 33 and 34 each of which is formed of two elementary seals 35, two scraper seals 56 and 57 are provided, which protect the seals 33 and 34 against molten metal splashes during the welding.

The motor-pump unit 36 comprises a motor 58 and a vane pump 59. The main pumping unit 38 comprises an electric motor 60 driving a Roots type pump 61 and a two-stage vane pump 62. These pumps are enclosed in a casing consisting of two half-shells, thus facilitating access to the various safety members and allowing the servicing of the pumps. Electromagnetic valves and vacuum probes (not shown) are also provided in the vacuumising equipment.

The fire prevention ring 32 is of steel; it is electrically insulated from the body of the mandrel 22 by alumina wedges (not shown). In order to permit good adjustment of the welding parameters, in the case of welding with two electron guns, the fire prevention ring 32 is advantageously formed of three sectors electrically insulated from one another. In order to permit rapid replacement of the fire prevention ring, the mandrel 22 may be adapted to be divided into two successive longitudinal portions in a joint plane 63 adjacent to the fire prevention ring 32. A baseplate (not shown), provided with passages insulated by O-rings, permits the disconnection of electric, pneumatic and vacuum circuits at this joint plane 63, which is preferably situated behind the fire prevention ring 32.

The welding check zone 27, which could be adapted to any form of checking, for example by gamma rays or ultrasonic beams, has here been specially designed for X-ray checking. A transmitter (not visible in the drawings) is placed on an electron gun carrier crown, outside the lengths of tubing 3 and 4. The members connected with this checking and disposed on the mandrel 22 are housed in a rotatable box 64, the rotation of which is controlled by the displacement of the X-ray transmitter by means of a motor-reduction gear unit 65, which is carried by the body of the mandrel 22 and which drives a ringgear 66 fixed to the box 64. The checking equipment comprises in particular a brightness amplifier 67, a mirror 68 inclined at an angle of 45° in relation to the axis of the mandrel 22, and a television camera 69 for examining and transmitting in real time the X-ray image. Graphic recording could also be provided.

At least some of the assemblies of guide rollers 39 are mounted on a mechanism ensuring concentric displacement of the rollers situated in the same longitudinal position along the mandrel 22 and correct centring of the mandrel in the length of tubing, despite the variations of diameter of a different lengths of tubing. The rollers of an assembly of this kind are mounted at one end of rocking bent levers 70 driven at their end by a sliding ring 71, which has the same axis as the mandrel 22 and which is movable longitudinally on a central shaft 72 fixed to the mandrel 22, against the action of calibrated springs 73. When the mandrel is engaged in a length of tubing 3 of smaller diameter, the calibrated springs 73 are crushed. They also compensate for the component due to the weight when the apparatus is used in an inclined laying bed.

In a section situated ahead of the assembly of rollers 39 bordering the seal 34, there is shown a connection of the mandrel body on each side of this section by means of elastic washers 74 loaded by a system of nuts and bolts, 75 which ensures the mechanical continuity of the mandrel. Beyond a certain predetermined bending moment, this assembly becomes flexible if the forces developed exceed the prestresses of the washers 74. A similar assembly can advantageously be placed behind the assembly of rollers 39 bordering the seal 33.

It will be understood that very many variations in the construction of the various elements of the mandrel 22 can be adopted without departing from the scope of the present invention.

For example, instead of the Roots pumps and vane pumps, the pumps used for the vacuum pumps could be turbo-molecular pumps or cryogenic pumps. Particularly in the same welding zone as that described previously, the mandrel could carry an electron gun making it possible to supplement external welding by internal welding of the two lengths of tubing. The welding could be checked by means of a transmitter and a receiver placed in both cases on the internal mandrel, the X-rays passing through the region of the weld by reflection on the walls of the lengths of tubing. This checking can also be done by ultrasonics.

We claim:

1. Internal mandrel used in carrying out an operation of butt joining two lengths of tubing by welding the ends of said lengths of tubing, which are disposed facing one another and which then define a junction region, said mandrel comprising sensing means capable of detecting the longitudinal position of one of said ends and centering means capable of centering said two ends relative to one another, and welding means for carrying out of the welding operation, the improvement wherein the sensing means (29) and the centering means (28) are disposed in a first matching zone (25) of the mandrel (22) and the welding means (32, 33, 34) are disposed in a second welding zone (26) of the mandrel (22), said second zone being separated longitudinally from the matching zone (25), and said mandrel (22) further provided with means for longitudinal displacement of the mandrel (22) inside the lengths of tubing (3,4) by a step equal to the distance from the welding zone (26) to the matching zone (25).

2. Internal mandrel according to claim 1, wherein said means for longitudinal displacement of the mandrel by a step comprise an assembly consisting of a link (41) operated by a jack and adapted to assume one of two lengths, the difference between which is equal to said step, and two controlled clamping members (31, 44) intervening in the retention of the mandrel (22) in the course of the operations of displacement of the latter, which clamping members are radially extensible and capable of bearing against an inside wall of a length of tubing (3, 4) and are mounted respectively on the side where one longitudinal end of the link (41) is situated and on the side where the other longitudinal end of the link (41) is situated.

3. Internal mandrel according to claim 2, wherein the sensing means and the centering means comprise, on the one hand, circumferentially distributed matching fingers (28) fastened to connecting rods (50) joined to a hydraulic finger extending jack (30) which when made operative moves the fingers (28) radially apart, said fingers being provided at the front with stop surfaces adapted to come to bear on the end of a length of tubing (3), and at the rear with inclined guide surfaces partially delimiting a kind of rearwardly pointing truncated cone, and, on the other hand, sensing rollers (29) situated in front of the fingers (28) and provided with means urging said rollers radially apart, together with a finger extending jack control means sensitive to the radial distance between the sensing rollers (29).

4. Internal mandrel according to claim 3, characterised in that the connecting rods (50) are articulated at one end on the fingers (28) and at the other end on a crown (51) forming the body of the finger extending jack (30).

5. Internal mandrel according to claim 3, characterised in that ahead of the matching fingers (28) and the sensing rollers (29) the mandrel (22) is provided with a radially extensible, controlled clamping member (31) adapted to bear against the inside wall of a length of tubing (3) in order to retain the mandrel (22) during matching.

6. Internal mandrel according to the combination of claim 5, characterised in that one (31) of the two controlled clamping members (31,44) cooperating in the retaining of the mandrel (22) in the course of the operations of displacement of the latter is constituted by the controlled clamping member serving to retain the mandrel (22) during matching.

7. Internal mandrel according to claim 1, wherein the welding zone (26) contains a fire prevention ring (32) electrically insulated and disposed between two inflatable seals (33, 34) mounted on said mandrel for application against an inside wall of a length of tubing (3, 4), and means for establishing a vacuum in the space delimited between said two seals (33, 34).

8. Internal mandrel according to claim 1, wherein it comprises a third welding check zone (27) disposed longitudinally, in relation to the second zone (26), on the opposite side to the first zone (25), and wherein it is provided with means (41) for longitudinal displacement by one step, which means are capable of displacing the mandrel (22) inside the lengths of tubing (3, 4) by a step equal to the distance from the welding check zone (27) to the welding zone (26).

9. Internal mandrel according to claim 8, characterised in that the step between the welding check zone

(27) and the welding zone (26) is equal to the step between the welding zone (26) and the matching zone (25), and in that the same means of longitudinal displacement by one step (41) is provided for displacing the mandrel by either of these steps.

10. Internal mandrel according to claim 8 or 9, wherein the welding check zone (27) contains a brightness amplifier (67) whose rotation is controlled in dependence on the displacement of an external rotationally driven X-ray transmitter.

11. Internal mandrel according to claim 1, characterised in that it comprises at least one assembly of guide rollers (39) mounted on rocking bent levers (70) driven by a sliding ring (71) movable longitudinally on the mandrel (22) against the action of springs (73).

12. Internal mandrel according to claim 7, characterised in that it comprises a joint plane (63) adjacent to the fire prevention ring (32) and enabling the mandrel (22) to be separated into two successive longitudinal portions.

13. Internal mandrel according to claim 1, characterised in that it contains, in at least one cross section, a connection of the body of the mandrel (22) on each side of that section by means of elastic washers (74) fastened to a system of nuts and bolts (75).

14. Internal mandrel according to claim 8, characterised in that it contains a main pumping system (38) for producing a vacuum in the space delimited between the two seals (33, 34), said main pumping system being disposed between the welding zone (26) and the welding check zone (27).

15. Internal mandrel according to claim 14, characterised in that it also contains an auxiliary pumping system (36) for spaces between elementary seals (35) constituting the two seals (33,34), this system being disposed between the matching zone (25) and the welding zone (26).

* * * * *